(12) United States Patent
Estieule et al.

(10) Patent No.: US 6,344,972 B2
(45) Date of Patent: Feb. 5, 2002

(54) ELECTRONIC EQUIPMENT

(75) Inventors: Bruno Estieule, Lyons; Patrick Luscher, Heyrieux; Daniel Maillard, Charnoz/Ain; Michel-André Robin, Lyons, all of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/734,666

(22) Filed: Dec. 13, 2000

(30) Foreign Application Priority Data

Dec. 14, 1999 (FR) .............................................. 99 15785

(51) Int. Cl.⁷ .................................................. H05K 5/00
(52) U.S. Cl. .......................................... 361/753; 439/92
(58) Field of Search ............................... 439/92, 95, 97; 361/753, 758, 804, 799; 174/51, 138 G

(56) References Cited

U.S. PATENT DOCUMENTS

| | | | | |
|---|---|---|---|---|
| 3,836,704 A | * | 9/1974 | Coules ........................ | 174/138 |
| 4,969,065 A | * | 11/1990 | Petri ........................... | 361/412 |
| 5,108,296 A | * | 4/1992 | Takano et al. ................ | 439/92 |
| 5,207,588 A | * | 5/1993 | Ladouceur et al. ........... | 439/84 |
| 5,381,308 A | * | 1/1995 | Wolpert et al. .............. | 361/809 |
| 5,491,892 A | * | 2/1996 | Fritz et al. ................... | 29/857 |
| 5,715,141 A | * | 2/1998 | Karlsson ...................... | 361/707 |
| 5,903,439 A | * | 5/1999 | Tamarkin .................... | 361/742 |
| 6,019,614 A | * | 2/2000 | Baur et al. ................... | 439/92 |

FOREIGN PATENT DOCUMENTS

| | | |
|---|---|---|
| JP | 03 096 297 | 4/1991 |
| JP | 08 236 175 | 9/1996 |
| WO | 0 466 264 A1 | 1/1992 |

* cited by examiner

*Primary Examiner*—Brian Sircus
*Assistant Examiner*—Thanh-Tam Le
(74) *Attorney, Agent, or Firm*—Sughrue Mion, PLLC

(57) ABSTRACT

To facilitate integration of electronic equipment into a system, a functional first connector of the electronic equipment is separated from a grounding second connector. In this way it is possible to test the dielectric capabilities of the electronic equipment in the laboratory and in situ and it is a simple matter to provide an electrical safety connection with conforms to a standard. In one example, the second connector includes a nut and a bolt.

11 Claims, 2 Drawing Sheets

ELECTRONIC EQUIPMENT

BACKGROUND OF THE INVENTION

1. Field of the Invention

The present invention relates to electronic equipment, in particular electronic equipment for use in the railroad art for controlling electrical power machines. The electronic equipment concerned consists mainly of circuits mounted on electronic cards, printed circuits, and including discrete circuits such as control integrated circuits, microprocessors, FPGA circuits, auto-couplers, transformers, capacitors or other circuits interconnected by electrical connections. The object of the invention is to simplify maintenance of the electronic equipment whilst complying with safety standards intended to protect operatives manipulating the electronic equipment or installations in which the electronic equipment is installed.

2. Description of the Prior Art

In the field of electronic equipment, and in particular the field of electronic equipment controlling power electronics, parts of the circuit are frequently made electrically independent of each other. Signals are then transmitted between the independent parts by inductive or optical coupling or even by radio transmission and reception. The independence of the circuits causes common mode currents to flow through potential barrier stray capacitances. The common mode currents can induce potentials in the electronic circuits which fluctuate in time and are interpreted as control signals. This disrupts the operation of the electronic equipment and the equipment malfunctions.

To remedy the above problems, and to limit the common mode currents, the circuits are screened, in particular provided with an electrical ground which is connected to the ground of a chassis, and an internal potential of the electronics, for example a zero volt connection of the electronics, is connected to the resulting ground at a location such that common mode currents collected in this way are evacuated without causing problems to the electronics. Thus in the railroad art the chassis concerned is electrically connected to a boiler of a railroad vehicle, for example a locomotive, which is also connected electrically to the rails on which the train travels. The rails are in turn connected to the ground on which they are laid by grounding terminals which are provided from place to place, via railroad ties which are generally insulative and poor conductors, being made of wood or concrete. If such precautions are not taken, fluctuating potential differences between the electronic circuit and the chassis connected to ground can cause high breakdown voltages. The high voltages can cause breakdowns in the integrated circuits of the electronic equipment, for example, or of the insulation. Independently of these common mode current and breakdown problems, there is a real danger to personnel having to manipulate the equipment. French standard NFC 15 100, which is concerned with the safety of persons, specifies that the voltage between any two points that a person can touch must not exceed 48 volts, for example.

An electrical connection between a zero volt circuit of a subsystem of electronic equipment and the ground of a chassis of the complete equipment is therefore necessary for reasons of electromagnetic compatibility. It is therefore also useful for reasons connected with the safety of persons likely to be in contact with bare metal parts of the subsystem or the complete equipment.

In the prior art the connection is provided by a wire which is connected to one terminal of a connector of the electronic equipment of the system. An installer, a system integrator, is responsible for integrating the equipment into the railroad vehicle and connects the screening of the equipment to the local ground.

The inventors have realized that the zero volt connection of the electronic equipment to the chassis ground of the complete equipment via the connector prevents production and system integration dielectric tests. These tests are carried out by the system integrator. Removability is obtained by providing a second connector, which in a preferred embodiment includes a removable bolt, to provide the zero volt connection of the electronic equipment to the chassis of the complete equipment, and this solves all the problems. Removability enables optimum design of the electrical connection at the level of designing the electronic equipment, rather than at the level of designing the complete equipment. In the prior art, electromagnetic compatibility of the complete equipment was achieved subject only to a given implementation of the connections by the equipment installer. Using a bolt, as in the invention, the equipment installer is prevented from making the electrical connections other than in accordance with the design of the circuit.

Over and above the bolt, which is the preferred form of connection because it is removable, simple and effective, the invention relates to defining the location for a second ground connector at the stage of designing the electronic equipment. That location is then chosen to improve electromagnetic compatibility, independently of the location chosen for a functional connector. It is then much more likely that an ideal implementation developed in the laboratory can be achieved on-site. Laboratory development can therefore minimize the impedance of the electrical connection for improved electromagnetic compatibility. The fact that the bolt can be removed improves access to the electrical connection and reduces its disconnection/reconnection time during dielectric tests. Finally, because fitting a bolt, as in the preferred embodiment, is so simple, it becomes feasible to provide several electrical connection locations independent of the position of the functional connections of the electronic equipment, so that the resultant impedance is reduced by the parallel connection of several zero volt electrical connections to the chassis ground, as close as possible to the functions to be protected from interference.

The various constraints referred to also indicate that it has been difficult to test the function of electronic equipment independently of its ground connection environment, since by definition a ground connection environment has been imposed. The constancy of these connections prevented effective verification that some parts of the electronic equipment are sufficiently insulated from the electrical ground of the chassis receiving the equipment. In particular, electronic equipment includes zero volt connections whose potential lies between relatively lower voltages (for example negative voltages) and relatively higher voltages (positive voltages). When the equipment is installed in the system, these zero volt connections must be connected to the ground of the chassis of the system.

During verification of the electronic equipment, insulation tests on the zero volt connections to ground and to the chassis of the electronic equipment are carried out using ohmmeters and dielectric measuring sets. The measured impedance must normally be greater than several megohms and the breakdown voltages greater than several hundred volts. What is more, the impedances are also measured with alternating currents to measure the reactances, which must be as low as possible to evacuate common mode currents and limit common mode voltages.

In accordance with the invention, to remedy the problems arising from the above constraints and the above mode of verifying the electronic equipment, there is further provision for making a zero volt connection and a ground connection to the electronic equipment. The two connections are independent of each other on the electronic equipment. As the two connections must be used, there is then provision for them to be connected together via the ground of a chassis on which the electronic equipment is mounted. In this way, once installed, the electronic equipment satisfies all constraints, in particular those imposed by the standard. It also satisfies the best operating conditions, those in which the zero volt is connected to the electrical ground (via the ground of the chassis). Finally, when the electronic equipment is demounted, or at least when the zero volt connection is disconnected, the two connections are electrically independent and the electronic circuit can then be tested in any way to reveal any malfunctions or insulation defects.

In the prior art, the reference equipotentials of the electronic control circuits, for example the zero volt connection, are connected via printed circuit connectors to the screening of the electronic control circuits of the power circuits (equipment chassis, electronic equipment cabinet or subrack), which are in turn connected to the chassis of the railroad vehicle, thence to the rails via the wheels of the vehicle, and thence to ground. According to the invention, the zero volt connection is always distributed to the electronic circuits via electronic circuit connectors, but this potential is connected at one precise point only to the screening of the electronics by a removable connection enabling the insulation of the zero volt connection to be insulated from the shielding and from ground to be verified at any time, including onboard the vehicle, whilst ensuring the safety of personnel and evacuation of common mode currents in normal operation, at a point decided on at the design stage.

SUMMARY OF THE INVENTION

The invention provides electronic equipment including a zero volt connection, functional connections, a first connector for connecting the functional connections of the equipment to connections of a system including a conductive chassis, and a second connector physically distant from the first connector for connecting the zero volt connection to a ground of the conductive chassis of the system, wherein the zero volt connection is electrically independent of the functional connections of the first connector.

The invention will be better understood after reading the following description and examining the accompanying drawings. The drawings are provided by way of non-limiting illustrative example only.

DETAILED DESCRIPTION OF THE PREFERRED EMBODIMENT

Figure 1:
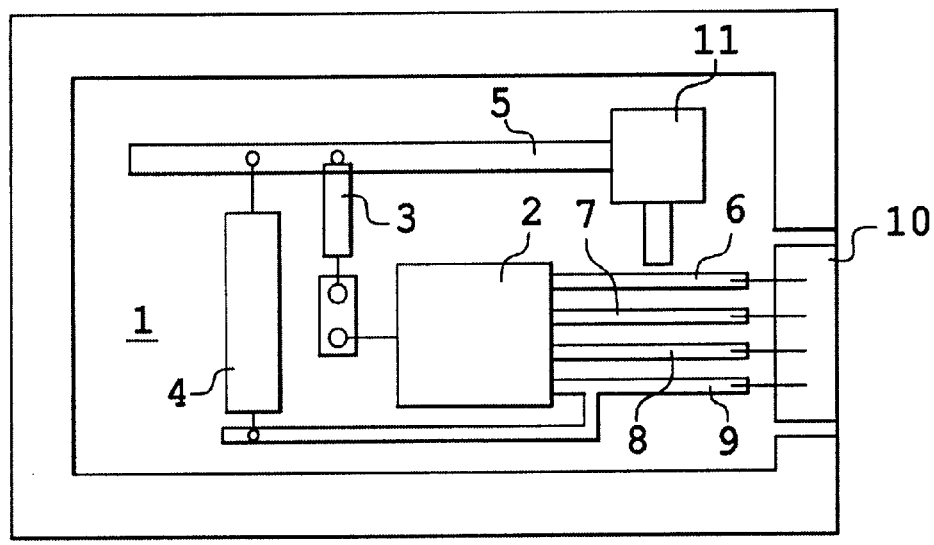
FIG. 1 is a diagrammatic representation of electronic equipment in accordance with the invention.

FIG. 1 shows electronic equipment in accordance with the invention. It includes a printed circuit 1 carrying electronic circuits 2 to 4. The electronic equipment 1 further includes a zero volt connection 5 and functional connections 6 to 9. One of the latter connections, for example the connection 8, can be a conventional ground connection. In this embodiment the connection 8 is electrically independent of the zero volt connection 5, to which it is electrically connected when the equipment is mounted in a system. In the prior art the connections 5 to 9 were all brought out to a connector 10 for connecting the electronic circuit 1 to a more comprehensive system (not shown) including corresponding connections and in particular ground connections. According to an essential feature of the invention the connections between the zero volt connection 5 and the ground connection 8 of the printed circuits have been eliminated. The connector 10 still carries the functional connections 5 to 9, which carry electrical control and/or power signals. The zero volt connection is provided by at least one additional second connector 11. The second connector 11 is for connecting the zero volt connection 5 to a conductive chassis supporting the electronic equipment 1.

Figure 2:
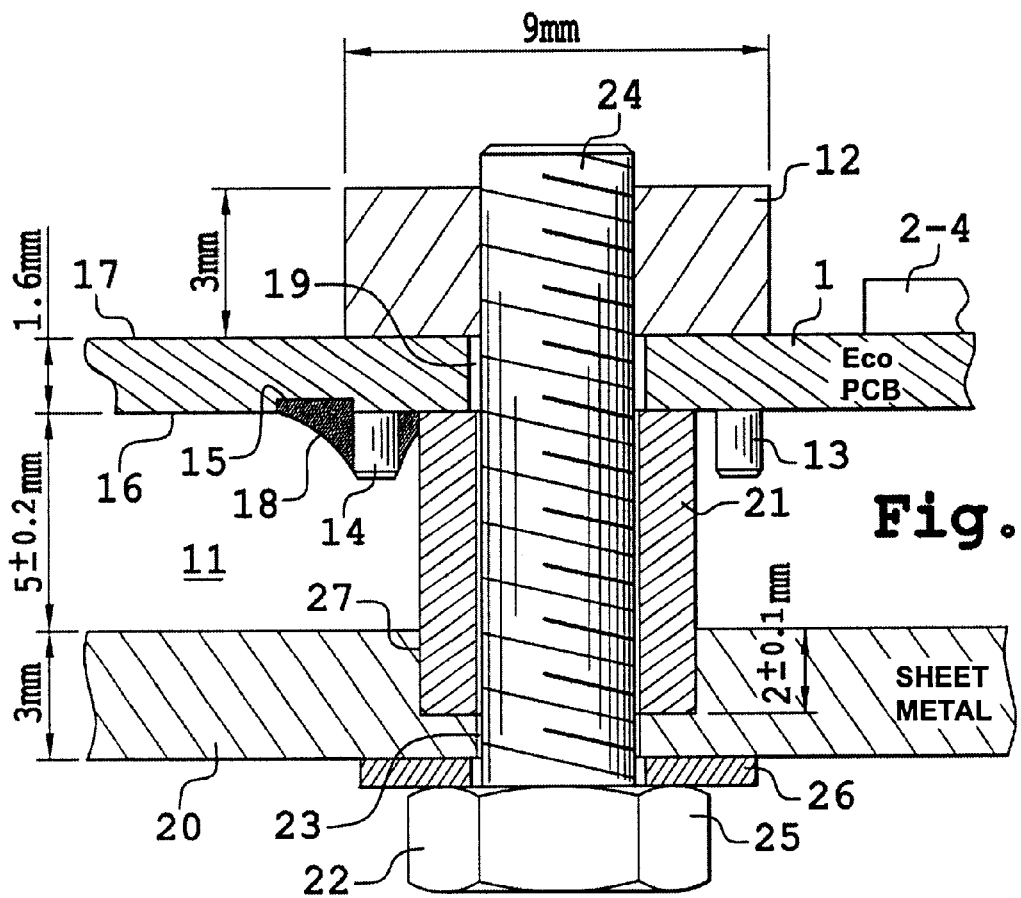
FIG. 2 shows details of a preferred embodiment of a second connector.

FIG. 2 shows a preferred embodiment of the second connector 11. The second connector 11 includes a nut 12 with pins 13 and 14 connected to an electrical track 15 of the electronic printed circuit 1. In one example the electronic equipment 1 includes a double-sided printed circuit and the track 15 is on the face 16 opposite the face 17 carrying the electronic circuits 2 to 4. In one example the pins 14 are soldered to the track 15 by solder beads 18. The beads 18 provide the mechanical connection of the nut 12 to the circuit 1 and the electrical connection of the track 15 to the conductive nut 12. The track 15 is connected to the connection 5, in particular by plated-through holes. The nut 12 is fixed to the circuit 1 opposite a hole 19 centered on the axis of its screwthread and slightly larger than the screwthread.

The circuit 1 is intended to be mounted in a system supported by a conductive chassis 20, which is made of sheet metal, for example. A spacer 21, which is preferably insulative, separates the chassis 20 from the circuit 1. To retain it, a bolt 22 passes through an opening 23 in the chassis 20 and its end 24 is screwed into the nut 12. The opening can be a hole or a notch in the chassis 20. The head 25 of the bolt 22 is preferably separated from the chassis 20 by an electrically conductive spring washer 26. The spring washer 26 enables calibrated compression of the spacer between the printed circuit 1 and the chassis 20, which is not rigid. This electrical compression also ensures that electrical continuity is not influenced by vibration. In the event of vibration, the elasticity of the washer 20 ensures electrical continuity between the sheet metal 20 and the track 15 at all times. The spacer 21 is preferably insulative and in the form of a cylindrical tube, made of PVC, for example, and surrounds the bolt 22. For improved overall retention the spacer 21 can be inserted into a bore 27 in the chassis 20. FIG. 2 also shows the preferred dimensions of the assembly.

Figure 3A:
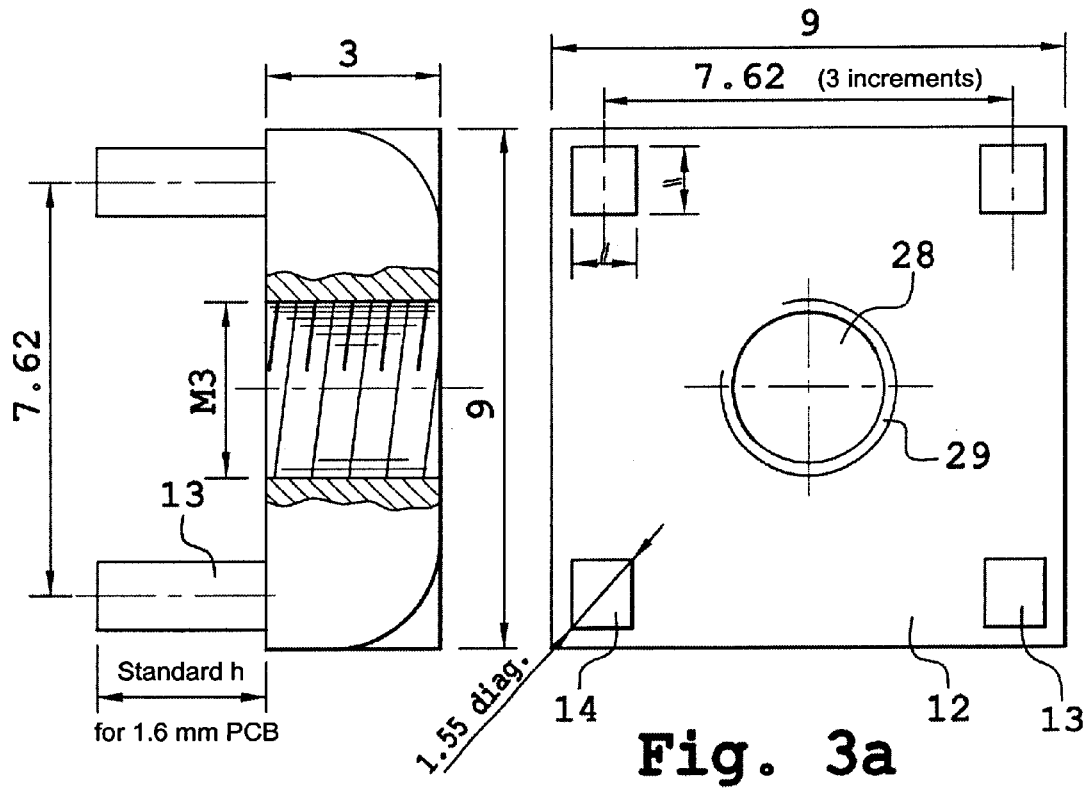
FIGS. 3a and 3b specify dimensions of the preferred second connector.

FIG. 3a shows a preferred embodiment of the nut. The right-hand part of the figure is a plan view of the nut 12 forming the connector 11 and the left-hand part is a view in section taken along one of the median lines. In one example the square nut 12 has four square section pins 13 to 14 at its four corners. The height of the pins is a standard height for printed circuits, typically 1.6 mm. The nut 12 has a hole 28 at the center which has a screwthread 29. At the locations to be soldered the nut 12, which is typically made of brass, is covered with a 2 to 5 micrometer thick film of copper in turn covered with a 3 to 6 micrometer thick layer of tin.

Figure 3B:
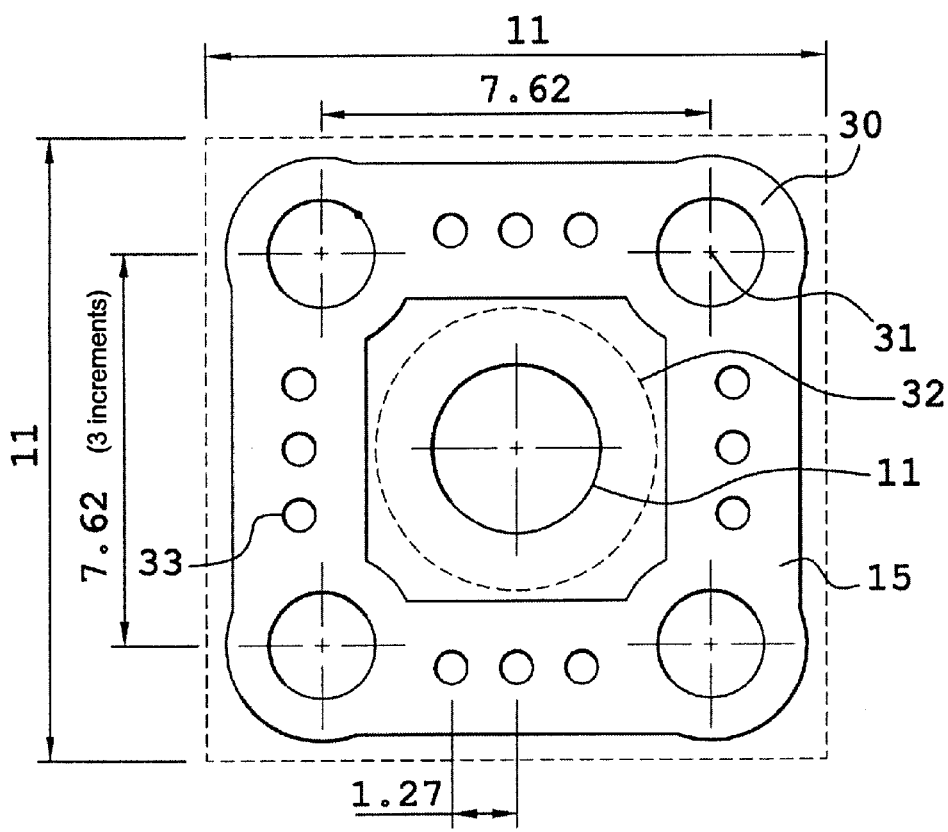

FIG. 3b shows the formation of a track 15 on the other face 16 of the printed circuit. The track 15 has four peripheral patches 30 around plated-through holes 31 each adapted to receive a pin 13 or 14. The plated-through holes 31 connect etched tracks on faces 16 of the printed circuit to tracks on faces 17 of the printed circuit, in particular they connect the track 5 to the track 15. The track 15 forms a quadrilateral leaving an area 32 with no tracks and a reservation 19 for a bore through which the bolt 22 passes. Vias 33 can also be plated-through holes.

If the connector 10 connects the ground track 8 to a ground of the chassis, fitting or removing the bolt 22 provides the electrical connection between the tracks 5 and 8 or isolates them, respectively. This is why the spacer 21 is insulative (it provides the insulation if the bolt 22 is not present) and is inserted into the bore 27 (it then provides this function on its own).

The distance from the connector 10 to the connector 11 is dictated by the best possible location of the bolt 22 in the light of the given electromagnetic compatibility constraints. Several connectors 11 can be mounted on the track 5 if necessary.

What is claimed is:

1. Electronic equipment comprising:
   a zero volt connection;
   a plurality of functional connections including a common ground connection;
   a first connector for connecting said functional connections of said equipment to connections of a system including a conductive chassis; and
   a second connector physically separated from said first connector for connecting said zero volt connection to a ground of said conductive chassis of said system, wherein said zero volt connection is electrically independent of said functional connections of said first connector.

2. The equipment claimed in claim 1, wherein said second connector includes a nut with pins connected by pins to an electrical track of said equipment, a mechanical spacer for separating said equipment from said chassis, and a conductive bolt passing through a reservation in said chassis, screwed into said nut with pins and connected to said chassis.

3. The equipment claimed in claim 2, wherein said pins of said nut are soldered to tracks of said equipment.

4. The equipment claimed in claim 3, wherein said nut is of brass covered in places with a film of copper covered with tin.

5. The equipment claimed in claim 2, wherein said spacer is insulative.

6. The equipment claimed in claim 2, wherein said spacer is cylindrical and surrounds said bolt.

7. The equipment claimed in claim 2, wherein said spacer rests in a bore in said chassis.

8. The equipment claimed in claim 2, wherein said bolt is electrically connected to said chassis by a conductive washer.

9. The equipment claimed claim 1, including a printed circuit with a zero volt track disconnected from a ground track and adapted to be connected to said ground track by said second connector.

10. The equipment claimed in claim 1, wherein said conductive chassis is that of a railroad vehicle.

11. Electronic equipment including a zero volt connection, functional connections, a first connector for connecting said functional connections of said equipment to connections of a system including a conductive chassis, and a second connector physically distant from said first connector for connecting said zero volt connection to a ground of said conductive chassis of said system, wherein said zero volt connection is electrically independent of said functional connections of said first connector, and said second connector includes a nut with pins connected by pins to an electrical track of said equipment, a mechanical spacer for separating said equipment from said chassis, and a conductive bolt passing through a reservation in said chassis, screwed into said nut with pins and connected to said chassis.

* * * * *